United States Patent
Yokota

(10) Patent No.: US 9,924,440 B2
(45) Date of Patent: Mar. 20, 2018

(54) COMMUNICATION APPARATUS, METHOD AND SYSTEM

(71) Applicant: CANON KABUSHIKI KAISHA, Tokyo (JP)

(72) Inventor: Akane Yokota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 508 days.

(21) Appl. No.: 14/289,560

(22) Filed: May 28, 2014

(65) Prior Publication Data

US 2014/0269661 A1    Sep. 18, 2014

Related U.S. Application Data

(63) Continuation of application No. 12/097,475, filed as application No. PCT/JP2007/051846 on Jan. 30, 2007, now Pat. No. 8,953,577.

(30) Foreign Application Priority Data

Feb. 17, 2006    (JP) .................... 2006-040960

(51) Int. Cl.
| | |
|---|---|
| *H04W 4/00* | (2009.01) |
| *H04L 12/56* | (2006.01) |
| *H04W 40/24* | (2009.01) |
| *H04W 76/00* | (2018.01) |
| *H04W 76/02* | (2009.01) |
| *H04W 8/26* | (2009.01) |
| *H04W 48/16* | (2009.01) |

(Continued)

(52) U.S. Cl.
CPC .......... *H04W 40/24* (2013.01); *H04W 76/00* (2013.01); *H04W 76/021* (2013.01); *H04W 8/26* (2013.01); *H04W 48/16* (2013.01); *H04W 48/18* (2013.01); *H04W 76/023* (2013.01); *H04W 84/18* (2013.01); *H04W 92/18* (2013.01)

(58) Field of Classification Search
CPC .... H04W 40/24; H04W 76/021; H04W 76/00
See application file for complete search history.

(56) References Cited

U.S. PATENT DOCUMENTS

| | | |
|---|---|---|
| 5,708,402 A | 1/1998 | Hachisu et al. |
| 5,815,055 A | 9/1998 | Eguchi et al. |

(Continued)

FOREIGN PATENT DOCUMENTS

| | | |
|---|---|---|
| JP | 2002-252620 A | 9/2002 |
| JP | 2004-222008 A | 8/2004 |

(Continued)

OTHER PUBLICATIONS

Russian Office Action dated Mar. 24, 2015 issued in corresponding Russian Patent Application No. 2013156596.

Primary Examiner — Gerald Smarth
(74) Attorney, Agent, or Firm — Fitzpatrick, Cella, Harper & Scinto

(57) ABSTRACT

If a network having the same SSID as but a different BSSID from those of a network that has been established by a first communication apparatus is detected, the network established by the first communication apparatus is terminated and the first communication apparatus participates in the detected network. This makes it possible for the first communication apparatus and another communication apparatus to participate in the same network.

29 Claims, 13 Drawing Sheets

(51) Int. Cl.
*H04W 48/18* (2009.01)
*H04W 84/18* (2009.01)
*H04W 92/18* (2009.01)

(56) References Cited

U.S. PATENT DOCUMENTS

| | | | |
|---|---|---|---|
| 6,020,672 | A | 2/2000 | Yokota et al. |
| 7,260,393 | B2 | 8/2007 | Fnu et al. |
| 2002/0022483 | A1 | 2/2002 | Thompson et al. |
| 2002/0118664 | A1 | 8/2002 | Ishibashi et al. |
| 2004/0039817 | A1 | 2/2004 | Lee et al. |
| 2004/0064591 | A1* | 4/2004 | Noble ............... H04L 41/0806 709/250 |
| 2004/0103282 | A1 | 5/2004 | Meier et al. |
| 2004/0110530 | A1 | 6/2004 | Alone et al. |
| 2004/0184422 | A1* | 9/2004 | Shaheen ........... H04W 36/0055 370/331 |
| 2004/0205158 | A1 | 10/2004 | Hsu |
| 2004/0214539 | A1* | 10/2004 | Rajamani ............. H04W 48/18 455/161.1 |
| 2005/0063334 | A1* | 3/2005 | Fnu ...................... H04W 48/16 370/329 |
| 2005/0148326 | A1 | 7/2005 | Nogawa et al. |
| 2005/0185626 | A1 | 8/2005 | Meier et al. |
| 2005/0238172 | A1 | 10/2005 | Tamura |
| 2005/0239497 | A1* | 10/2005 | Bahl .................... H04W 88/06 455/552.1 |
| 2005/0250487 | A1 | 11/2005 | Miwa et al. |
| 2006/0014537 | A1 | 1/2006 | Arai et al. |
| 2006/0089138 | A1 | 4/2006 | Smith et al. |
| 2006/0092888 | A1 | 5/2006 | Jeong et al. |
| 2006/0128360 | A1* | 6/2006 | Hibino ................. H04L 63/104 455/411 |
| 2006/0153156 | A1* | 7/2006 | Wentink ................ H04W 8/22 370/338 |
| 2006/0171388 | A1 | 8/2006 | Ikeda |
| 2007/0073868 | A1 | 3/2007 | Nelson et al. |
| 2007/0081477 | A1 | 4/2007 | Jakkahalli et al. |
| 2007/0140188 | A1 | 6/2007 | Melkote et al. |
| 2007/0232350 | A1 | 10/2007 | Dunn et al. |
| 2007/0275701 | A1 | 11/2007 | Jonker |
| 2008/0076423 | A1 | 3/2008 | Lee et al. |
| 2008/0089300 | A1 | 4/2008 | Yee |
| 2011/0170528 | A1 | 7/2011 | Melkote et al. |
| 2011/0208866 | A1 | 8/2011 | Marmolejo-Meillon et al. |

FOREIGN PATENT DOCUMENTS

| | | |
|---|---|---|
| JP | 2005-323116 A | 11/2005 |
| JP | 2006-20345 A | 1/2006 |
| WO | 01/56254 A1 | 8/2001 |
| WO | 2004/013986 A1 | 2/2004 |
| WO | 2004/077752 A1 | 9/2004 |
| WO | 2004/084463 A2 | 9/2004 |

* cited by examiner

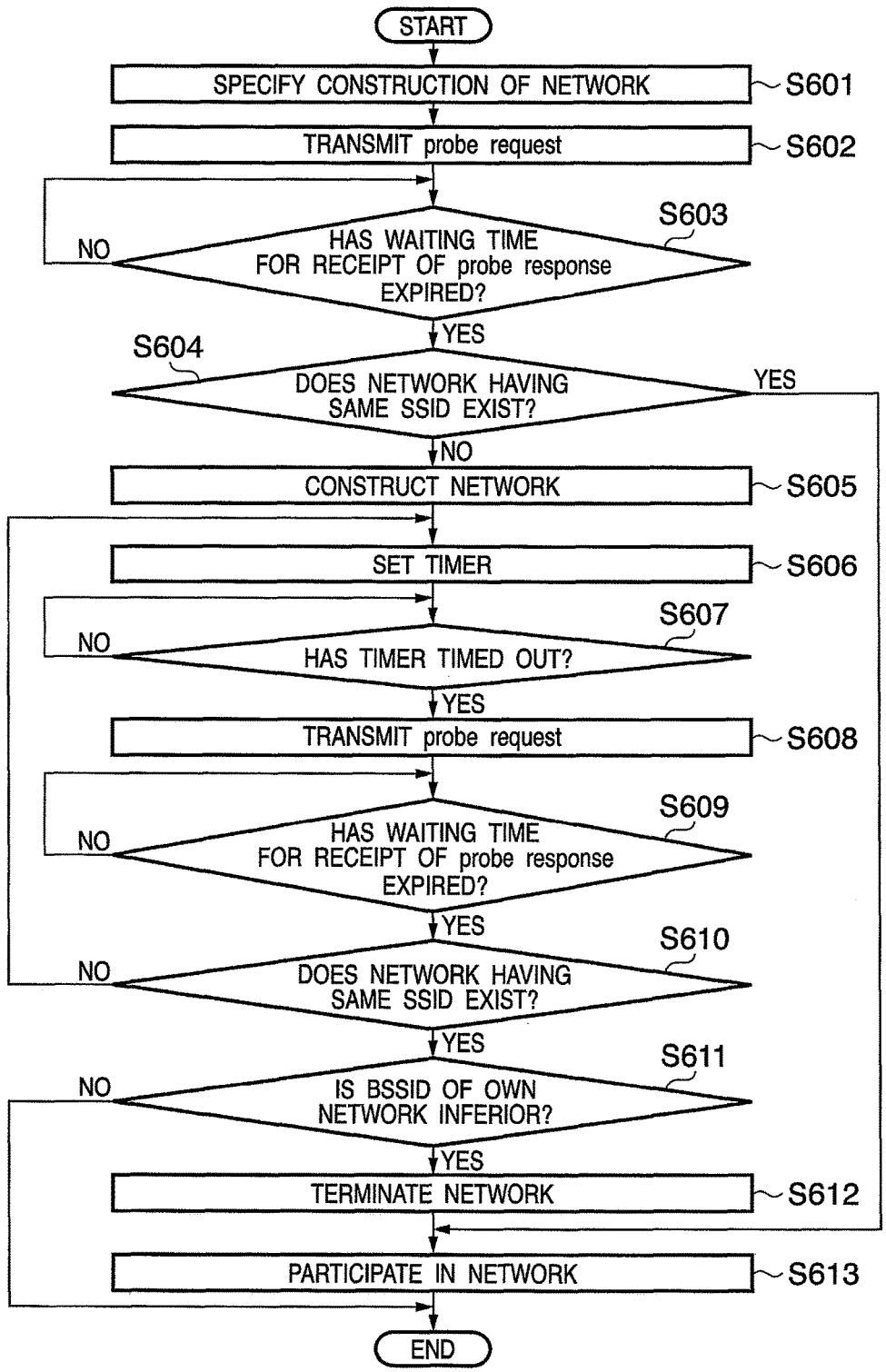

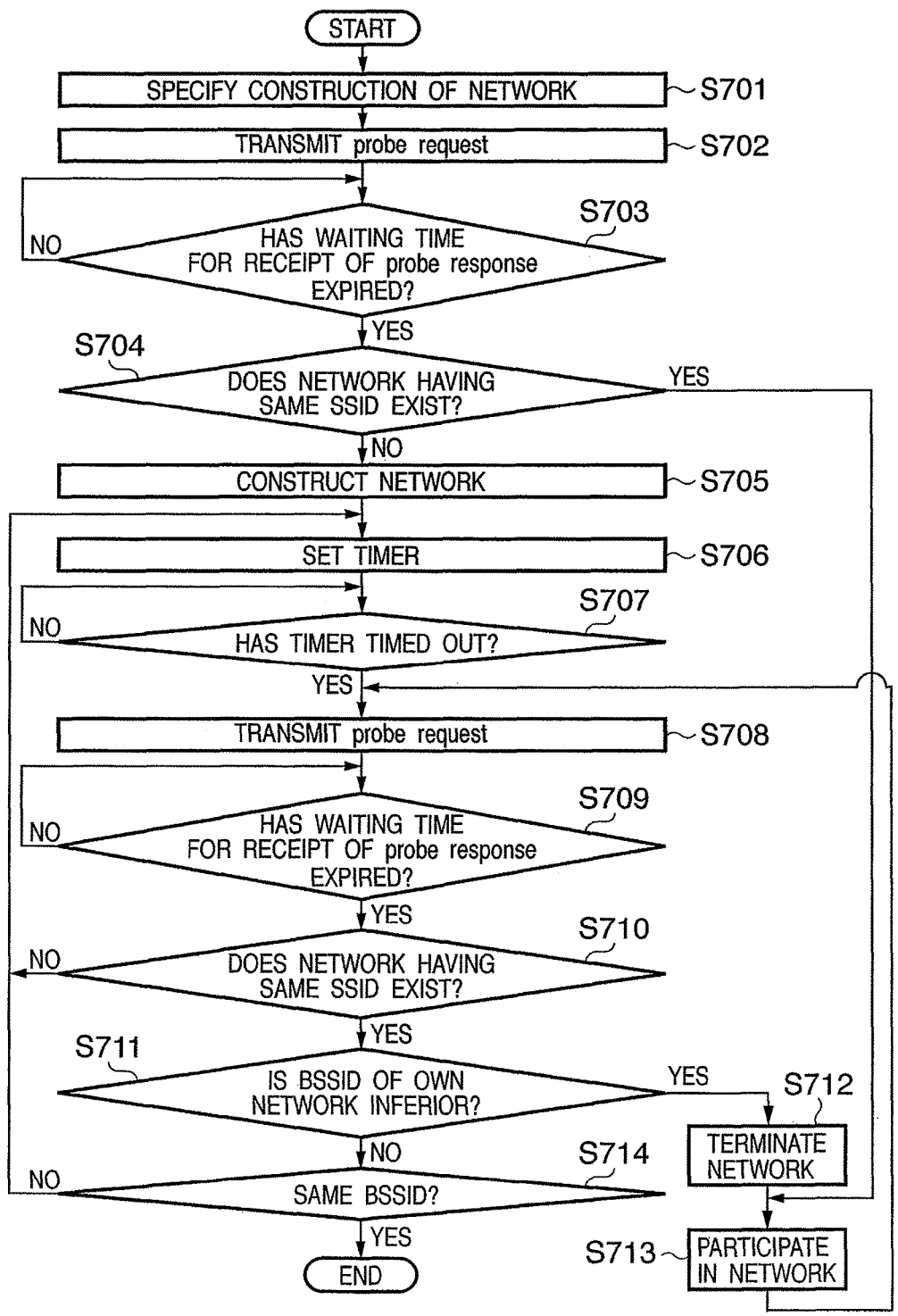

FIG. 8C

REGISTRATION PROCESSING
IN PROGRESS

CANCEL

FIG. 8D

REGISTRATION COMPLETED

QUIT

807

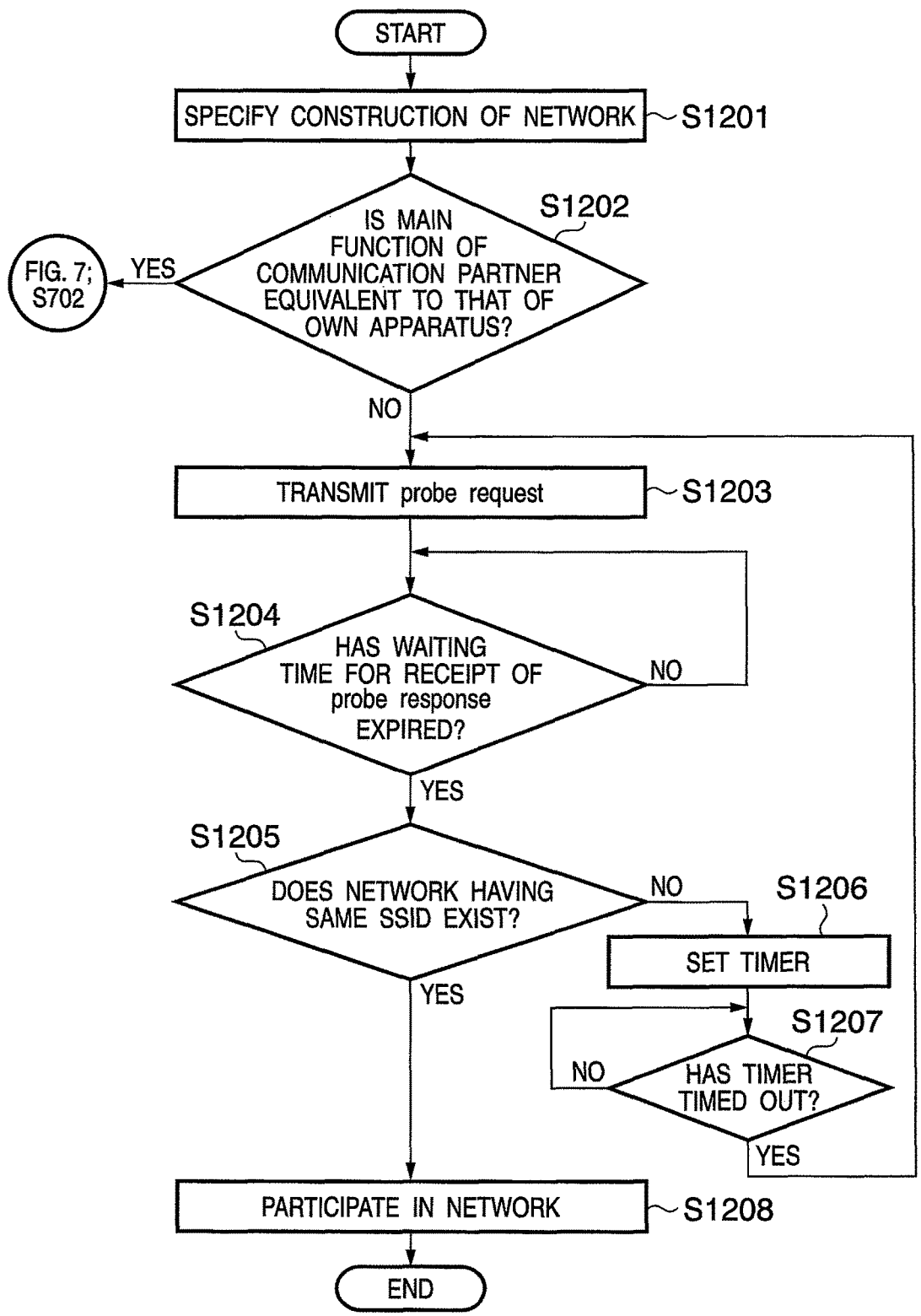

US 9,924,440 B2

COMMUNICATION APPARATUS, METHOD AND SYSTEM

This application is a continuation of U.S. Application No. 12/097,475 which is a National Stage of PCT/JP2007/051846 filed Jan. 30, 2007, the contents of each of which are incorporated herein by reference.

TECHNICAL FIELD

The present invention relates to a communication apparatus, communication method and communication system.

BACKGROUND ART

A large number of devices equipped with a wireless function including an IEEE (Institute of Electrical and Electronics Engineers) 802.11 wireless LAN have been registered and manufactured in recent years.

An example of a communication method based upon the IEEE 802.11 wireless LAN is the ad-hoc mode, in which terminals communicate with each other directly. This is in addition to the infrastructure mode, in which communication is performed via access points.

In the ad-hoc mode of an IEEE 802.11 wireless LAN, a terminal attempting to establish a network transmits a notification signal, which is referred to as a beacon, thereby establishing the network. A terminal that is to participate in the network does so and communicates based upon information (beacon period, transmission rate, etc.) contained in the beacon.

Between terminals that construct the network, the communication channel and wireless communication parameters such as the network identifier, encryption methods and encryption key must be set to common values. In an IEEE 802.11 wireless LAN, there are two types of network identifiers, namely SSID (Service Set Identification) and BSSID (Basic Service Set Identification) [see the specification of U.S. Patent Laid-Open No. 2005/250487 (Japanese Patent Application Laid-Open No. 2005-323116)].

The SSID is an identifier that can be set to any value by the user and that is also capable of being set in a terminal in advance. On the other hand, the BSSID is an identifier generated by a terminal that establishes an ad-hoc network, namely a terminal that transmits a beacon first, based upon the terminal's own MAC (Media Access Control) address, etc. In a case where terminals communicate via the same wireless communication, these two network identifiers must be set to a common value between the terminals.

For example, in order to perform wireless communication in the ad-hoc mode, assume that a common SSID is set between two terminals in advance. In order for one of these terminals to establish an ad-hoc network, the terminal generates the BSSID and starts to transmit a beacon. When this is done, the other terminal sets itself to this BSSID, thereby making it possible to communicate in the ad-hoc mode.

However, there is the possibility that when both terminals attempt to establish an ad-hoc network substantially simultaneously, each terminal will generate a respective BSSID and start transmitting a beacon, thereby constructing separate ad-hoc networks. In such case the two terminals will not be able to communicate wirelessly with each other regardless of the fact that the same SSID has been set.

DISCLOSURE OF INVENTION

The present invention so arranges it that even if a plurality of communication apparatuses that intend to participate in the same network have constructed different networks, the same network can be constructed.

According to one aspect of the present invention, there is provided a communication apparatus for communicating with another communication apparatus using a first network identifier and a second network identifier, comprising: a detection unit adapted to detect a network that is present in the surroundings; a discrimination unit adapted to discriminate a first network identifier and a second network identifier of a network detected by the detection unit; a comparison unit adapted to compare the first and second network identifiers discriminated by the discrimination unit and the first and second network identifiers, respectively, of the network to which the communication apparatus belongs; and a control unit adapted to control participation in the detected network in accordance with result of the comparison performed by the comparison unit.

According to another aspect of the present invention, there is provided a communication apparatus for communication with another communication apparatus using a network identifier, comprising: a detection unit adapted to detect a network that is present in the surroundings; a comparison unit adapted to compare a network identifier of a network detected by the detection unit and a network identifier of a network to which the communication apparatus belongs; and a control unit adapted to terminate communication by the network to which the communication apparatus belongs and allow the communication apparatus to participate in the detected network in accordance with result of the comparison performed by the comparison unit.

Furthermore, according to another aspect of the present invention, there is provided a communication system for performing communication using a first network identifier that has been set in a first communication apparatus and in a second communication apparatus, the first communication apparatus comprising: a detection unit adapted to detect a network to which the second communication apparatus belongs; a comparison unit adapted to compare a second network identifier of the network detected by the detection unit and a second network identifier of the network to which the first communication apparatus belongs; and a control unit adapted to allow the first communication apparatus and the second communication apparatus to participate in the same network based upon result of the comparison performed by the comparison unit.

Furthermore, according to another aspect of the present invention, there is provided a method whereby a plurality of communication apparatuses construct a network, comprising: a first step of constructing a network by allowing a second communication apparatus to participate in a network established by a first communication apparatus; a second step of constructing a network by allowing the first communication apparatus to participate in a network established by the second communication apparatus; and a third step of selectively executing construction of a network by either the first or second step in dependence upon the type of communication apparatus that constructs the network.

Furthermore, according to another aspect of the present invention, there is provided a communication method of communicating with another communication apparatus using a first network identifier and a second network identifier, comprising: a detection step of detecting a network that is present in the surroundings; a discrimination step of discriminating a first network identifier and a second network identifier of a network detected at the detection step; a comparison step of comparing the first and second network identifiers discriminated at the discrimination step and the first and second network identifiers, respectively, of the network to which the communication apparatus belongs; and a control step of controlling participation in the detected network in accordance with result of the comparison performed by the comparison unit.

Further features of the present invention will become apparent from the following description of exemplary embodiments with reference to the attached drawings.

BRIEF DESCRIPTION OF DRAWINGS

FIG. 6 is a flowchart illustrating operation of the DSC and printer according to the second embodiment;

FIG. 7 is a flowchart illustrating operation of the DSC and printer according to the second embodiment;

FIGS. 8A to 8D illustrate examples of display units of the DSC and printer according to the third embodiment;

FIG. 12 is a flowchart illustrating operation of the DSC according to the fourth embodiment.

BEST MODE FOR CARRYING OUT THE INVENTION

Preferred embodiments of the present invention will be described in detail with reference to the drawings. It should be noted that the present invention is not limited to the embodiment and can be modified in various ways within the scope of the claims.

(First Embodiment)

Figure 1:
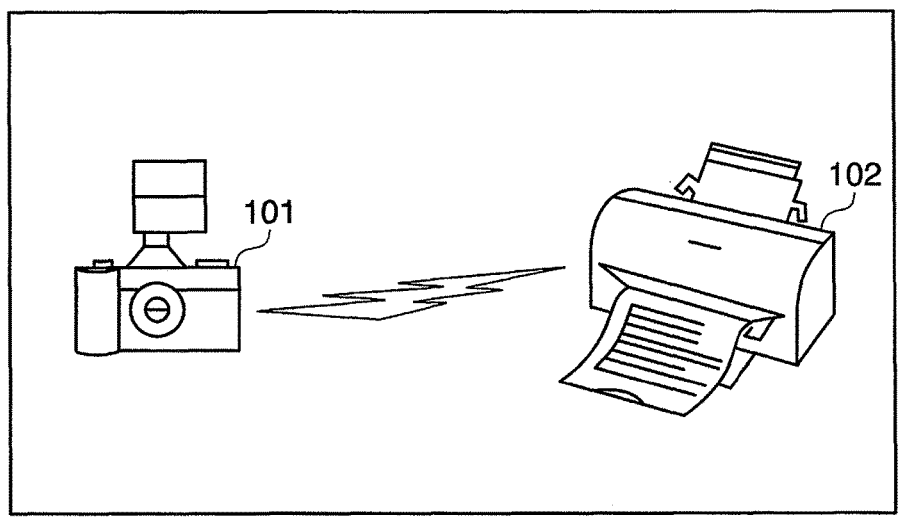
FIG. 1 is a diagram illustrating the configuration of a wireless communication network in first to fourth embodiments of the present invention.

FIG. 1 is a diagram illustrating an example of the configuration of a wireless communication network in a first embodiment of the present invention. Described in this embodiment is a case where an ad-hoc network is constructed between a digital still camera (DSC) 101 and a printer 102 each of which serves as a wireless communication apparatus.

In order to construct the ad-hoc network, two network identifiers, namely the SSID (Service Set Identification) and BSSID (Basic Service Set Identification), must be set to a common value.

The SSID is an identifier that can be set to any value by the user and that is also capable of being set in a terminal in advance. In this embodiment, "AdhocNet" has been set beforehand as the SSID in the DSC 101 and printer 102.

On the other hand, the BSSID is an identifier generated by a terminal that establishes an ad-hoc network, namely a terminal that transmits a beacon first, based upon the terminal's own MAC (Media Access Control) address, etc.

By pressing wireless communication buttons provided on respective ones of the DSC 101 and printer 102, these start executing processing for constructing the ad-hoc network. For example, when the wireless communication button on the DSC 101 is pressed, the DSC 101 checks to determine whether a network whose SSID is "AdhocNet" exists, namely whether the printer 102 has already established a network. If the printer 102 has already established a network, then the DSC 101 is set to the BSSID generated by the printer 102 and participates in the network. If the printer 102 has not established a network, on the other hand, then the DSC 101 itself establishes a network, generates the BSSID and starts transmission of a beacon.

Figure 2:
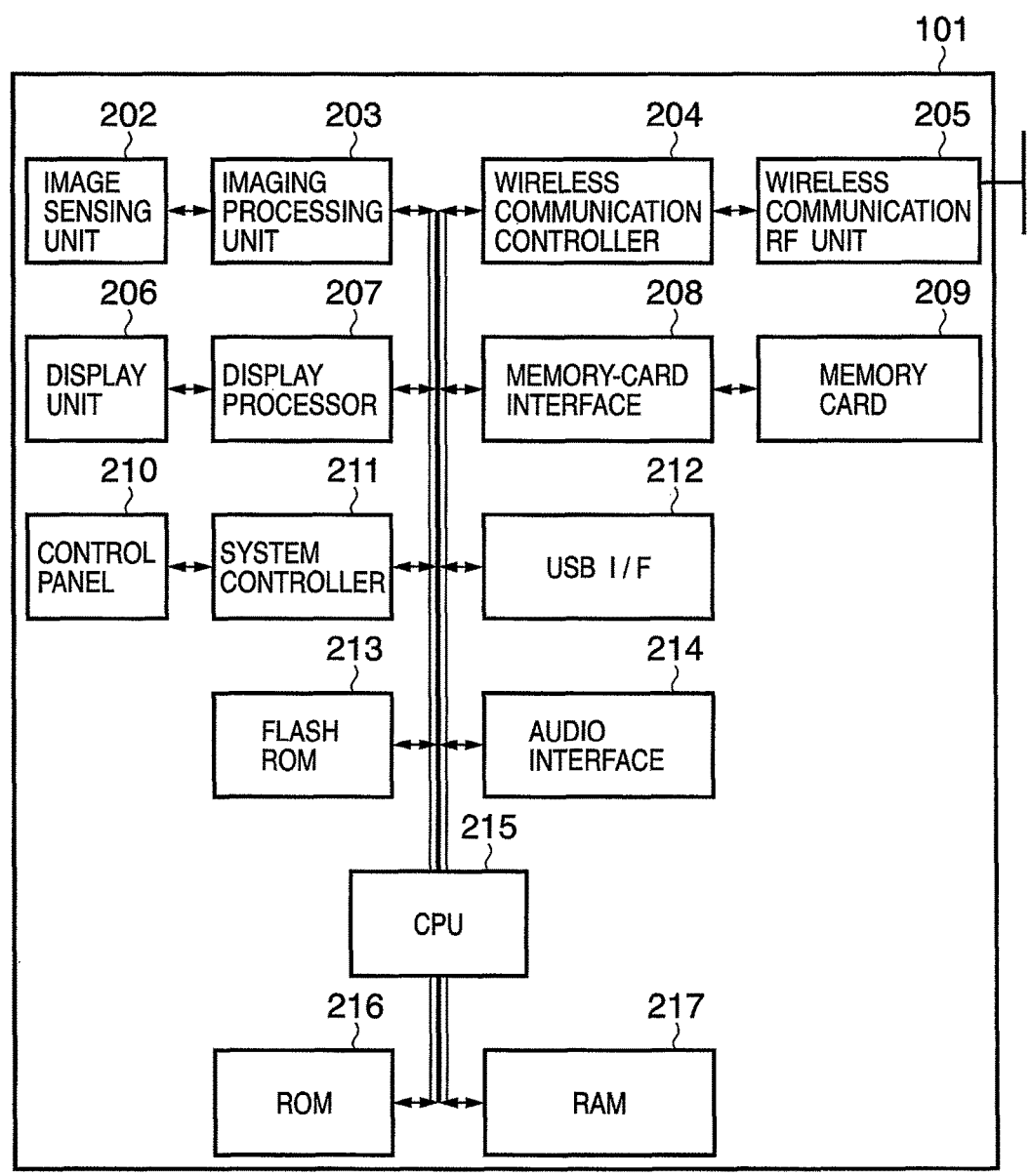
FIG. 2 is a functional block diagram of a digital still camera (DSC) in the first to fourth embodiments.

FIG. 2 is a functional block diagram of a DSC 101 according to the first embodiment.

A control panel 210 is connected to a CPU 215 via a system controller 211. The control panel 210 includes various keys such as a shutter-release switch and wireless communication button. The system controller 211 has a timer (not shown).

An image sensing unit 202 is a block for sensing an image when the shutter-release switch of the control panel 210 is pressed. An image signal that is output from the image sensing unit 202 is processed by an imaging processing unit 203.

A display unit 206 is a block for presenting information to the user and is an LCD (Liquid Crystal Display), LED (Light-Emitting Diode) display or voice display, etc. Processing for controlling the content of the display presented by the display unit 206 is executed by a display processor 207. Further, operation such as the selection of desired information from information displayed by the display unit 206 is carried out in operative association with the control panel 210. That is, the display unit 206 and control panel 210 construct a user interface.

A memory-card interface 208 is an interface for connecting a memory card 209. A USB (Universal Serial Bus) interface 212 is an interface for connecting an external device using a USB. An audio interface 214 is an interface for connecting an audio signal to an external device.

A wireless communication RF unit 205 and a wireless communication controller 204 are combined to construct a wireless unit. The wireless communication RF unit 205 includes a hardware block for digitizing an analog signal received from an antenna and, conversely, for converting digital information to an analog signal and transmitting the signal from the antenna. The wireless communication controller 204 is constituted by a MAC layer that controls communication and hardware for processing firmware that drives the MAC layer. The wireless communication controller 204 has an internal flash ROM that is capable of storing a MAC address, etc.

The functional portions indicated in this block diagram are implemented by control exercised by the CPU 215. A program for implementing the processing of FIGS. 5, 6, 7 and 12 described later has been stored in a ROM (Read-Only Memory) 216 or flash ROM 213 and the CPU 215 executes processing in accordance with this program. The firmware for the wireless unit has been stored in a flash ROM, etc., within the wireless communication controller 204, in the flash ROM 213 provided on the side of the DSC 101, or in the ROM 216. In the case of the latter, the firmware is loaded in the wireless communication controller 204 when the wireless unit is utilized. Further, parameters such as the SSID and an encryption key that are necessary for wireless communication have been stored in the flash ROM 213. When the wireless unit is utilized, a driver delivers these values to the wireless communication controller 204, thereby making wireless communication possible.

Further, data to be processed by the CPU 215 is written to and read from a RAM (Random-Access Memory) 217 or the flash ROM 213. The flash ROM 213 is a non-volatile storage area. Image data resulting from imaging is stored on the memory card 209 via the memory-card interface 208.

Figure 3:
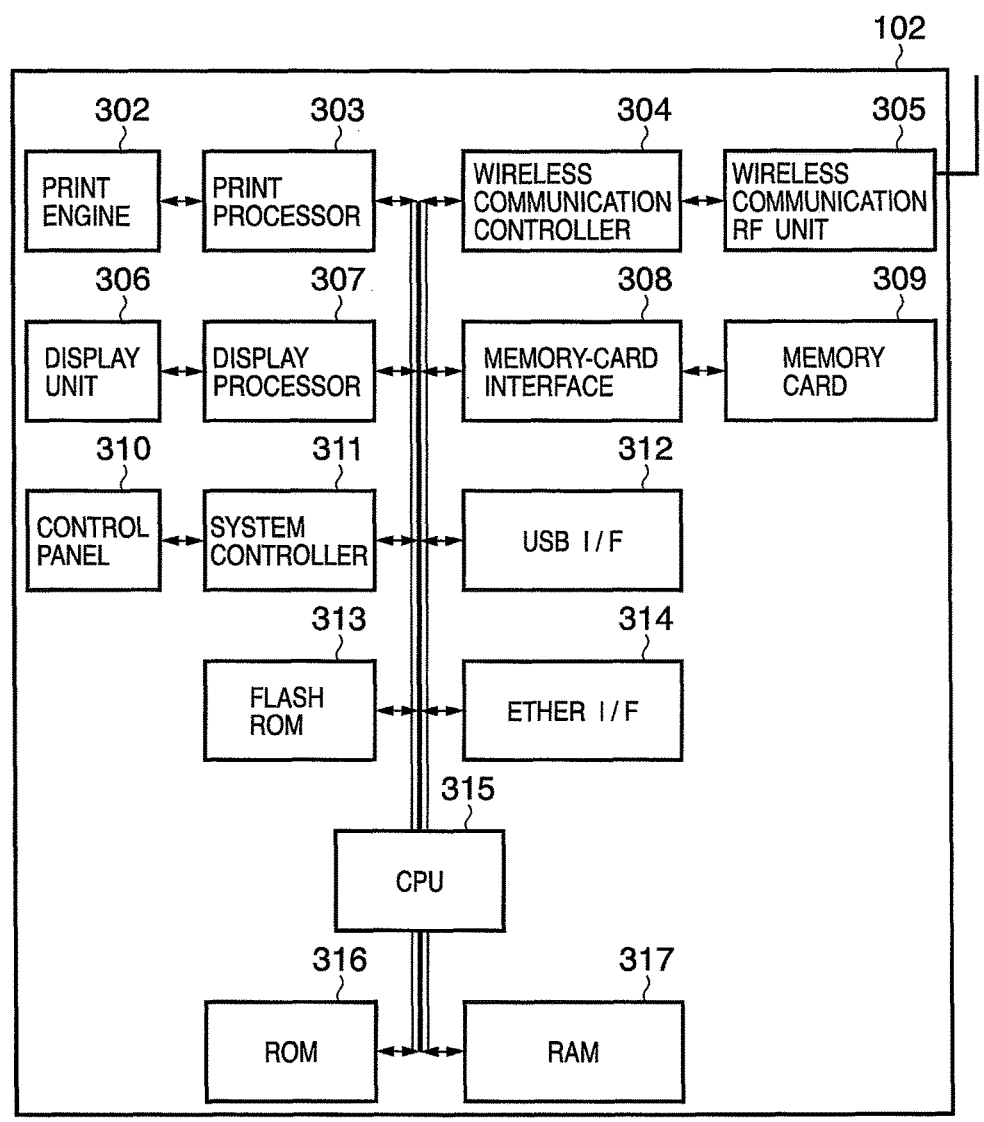
FIG. 3 is a functional block diagram of a printer in the first to fourth embodiments.

FIG. 3 is a functional block of the printer 102 according to the first embodiment. A printer control panel 310 is connected to a CPU 315 via a system controller 311. The printer control panel 310 includes various keys such as a wireless communication button. The system controller 311 has a timer (not shown).

A print engine 302, which is a functional block for actually printing an image on paper, is controlled by a print processor 303. Any type of print engine 302 may be used so long as it has a function for printing an image on paper. However, the printer 102 shown in FIG. 1 is an ink-jet printer for discharging ink droplets onto a print medium such as paper by thermal energy.

A display unit 306 is a block for presenting information to the user and is an LCD, LED display or voice display, etc. Control of the content of the display presented by the display unit 306 is performed by a display processor 307. Further, operation such as the selection of desired information from information displayed by the display unit 306 is carried out via the control panel 310. That is, the display unit 306 and control panel 310 construct the user interface of the printer 102.

A memory-card interface 308 is an interface for connecting a removable memory card 309. By inserting the memory card, with which the DSC is equipped, into the interface, an image captured by imaging can be printed.

A USB interface 312 is an interface for connecting an external device using a USB. An ETHER interface 314 is an interface for connecting an external device using ETHER communication.

A wireless communication RF unit 305 and a wireless communication controller 304 are combined to construct a wireless unit. The wireless communication RF unit 305 includes a hardware block for digitizing an analog signal received from an antenna and, conversely, for converting digital information to an analog signal and transmitting the signal from the antenna. The wireless communication controller 304 is constituted by a MAC layer that controls communication and hardware for processing firmware that drives the MAC layer. The wireless communication controller 304 has an internal flash ROM that is capable of storing a MAC address, etc.

The functional portions indicated in this block diagram are implemented by control exercised by the CPU 315. A program for implementing the processing of FIGS. 5, 6, 7 and 11 described later has been stored in a ROM 316 or in a flash ROM 313 and the CPU 315 executes processing in accordance with this program. The firmware for the wireless unit has been stored in a flash ROM, etc., within the wireless communication controller 304, in the flash ROM 313 provided on the side of the printer 102, or in the ROM 316. In the case of the latter, the firmware is loaded in the wireless communication controller 304 when the wireless unit is utilized. Further, parameters such as the SSID and an encryption key that are necessary for wireless communication have been stored in the flash ROM 313. When the wireless unit is utilized, a driver delivers these values to the wireless communication controller 304, thereby making wireless communication possible.

Further, data to be processed by the CPU 315 is written to and read from a RAM 317 or the flash ROM 313.

Figure 4:
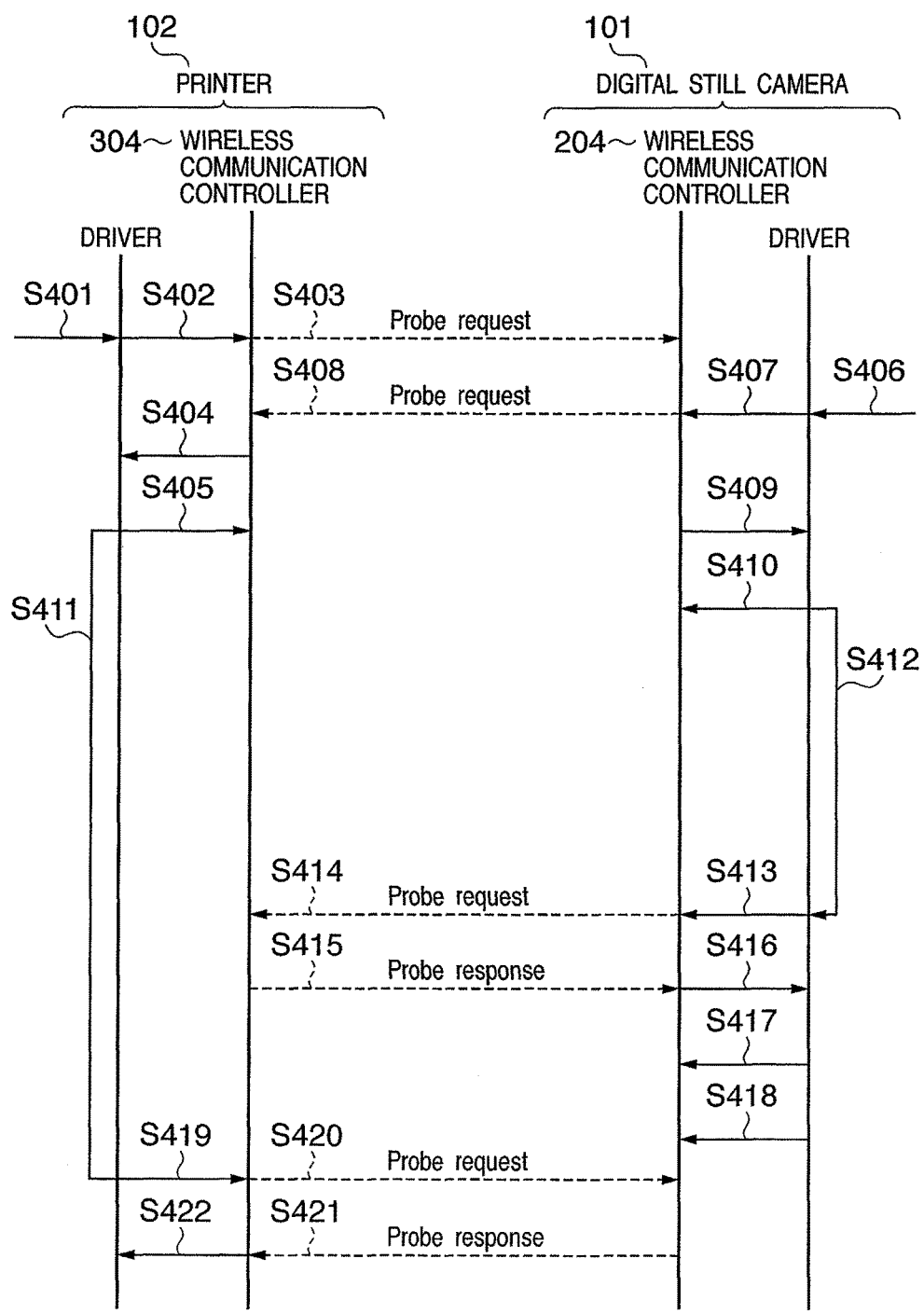
FIG. 4 is a sequence diagram illustrating a procedure for constructing an ad-hoc network according to the first embodiment.

FIG. 4 is a diagram illustrating a sequence in a case where the DSC 101 and printer 102 have established an ad-hoc network substantially simultaneously. Described here will be a case where this sequence is generated by pressing the wireless communication buttons of the DSC 101 and printer 102 substantially simultaneously.

When the wireless communication button of the printer 102 is pressed, the application program sends the driver a request to construct an ad-hoc network whose SSID is "AdhocNet" (S401).

Upon receiving the request from the application program, the driver starts scanning (search processing) in order to determine whether an ad-hoc network having the "Adhoc-Net" SSID exists. First, a series of commands for scanning are issued from the driver to the wireless communication controller 304 (S402). Next, the commands are processed by the wireless communication controller 304 and wireless communication RF unit 305 and a probe request (search request) is transmitted thereby (S403). Receipt of a response (probe response) to the probe request is awaited for a fixed period of time.

Since the probe response includes the SSID, whether a network having the "AdhocNet" SSID already exists can be checked by extracting the SSID from the probe response received.

Further, if "AdhocNet" is specified in the SSID of the probe request and transmitted, then only a communication apparatus that constructs the network whose SSID is "AdhocNet" will send back a probe response. Accordingly, whether a network whose SSID is "AdhocNet" has already been constructed or not can be determined in dependence upon whether or not the probe response is received.

At this point in time the DSC 101 has not yet established an ad-hoc network and therefore the response standby time elapses without the printer 102 receiving a probe response.

Upon confirming that a network does not exist (S404), the driver of the printer 102 sends the wireless communication controller 304 a series of setting commands for establishing an ad-hoc network whose SSID is "AdhocNet" (S405).

The wireless communication controller 304 processes the commands received from the driver and establishes an ad-hoc network having "AdhocNet" as its SSID. More specifically, the wireless communication controller 304 generates a BSSID from the MAC address of its own printer 102 and starts transmitting a beacon.

The processing executed by the DSC 101 will be described next.

When the wireless communication button on the DSC 101 is pressed, an application program sends the driver a request to construct the ad-hoc network whose SSID is "AdhocNet" (S406).

Upon receiving the request from the application program, the driver starts scanning in order to determine whether an ad-hoc network having the "AdhocNet" SSID exists. First, a series of commands for scanning are issued from the driver to the wireless communication controller 204 (S407).

Next, the commands are processed by the wireless communication controller 204 and wireless communication RF unit 205 and a probe request is transmitted thereby (S408). Receipt of a probe response is awaited for a fixed period of time.

At this point in time the printer 102 has not yet established an ad-hoc network and therefore the response standby time elapses without the DSC 101 receiving a probe response.

Upon confirming that a network does not exist (S409), the driver of the DSC 101 sends the wireless communication controller 204 a series of setting commands for establishing an ad-hoc network whose SSID is "AdhocNet" (S410). The wireless communication controller 204 processes the commands received from the driver and establishes an ad-hoc network having "AdhocNet" as its SSID. More specifically, the wireless communication controller 204 generates a BSSID from the MAC address of its own DSC 101 and starts transmitting a beacon.

At the moment step S410 ends, the DSC 101 and printer 102 construct separate ad-hoc networks having different BSSIDs regardless of the fact that the SSIDs are identical, namely "AdhocNet".

After establishing the ad-hoc network (S405), the printer 102 sets any time T1 in the timer possessed by the system controller 311 (S411). Similarly, after step S410, the DSC 101 sets any time T2 in the timer possessed by the system controller 211 (S412). In FIG. 4, the time T2 set by the DSC 101 is shorter than the time T1 set by the printer 102 and therefore time T2 in the timer of DSC 101 elapses first.

When time T2 elapses, the DSC 101 performs scanning in order to determine whether an ad-hoc network having an SSID identical with the SSID "AdhocNet" of the ad-hoc network established by the DSC 101 itself exists. The driver of the DSC 101 sends the wireless communication controller 204 a series of commands for scanning purposes (S413). The wireless communication controller 204 and the wireless communication RF unit 205 process the commands and transmit a probe request (S414).

Since the printer 102 has specified "AdhocNet" in the SSID and established an ad-hoc network, at this time the printer 102 sends back a probe response to the DSC 101 (S415).

When the DSC 101 receives the probe response, the wireless communication controller 204 delivers to the driver the information obtained from the probe response (S416). From the delivered information, the driver learns of the existence of the other ad-hoc network having the same SSID and a different BSSID from those of the network established by the DSC 101.

When this occurs, the driver of the DSC 101, in order to participate in the ad-hoc network established by the printer 102, sends the wireless communication controller 204 a series of setting commands for terminating the network established by the DSC 101 (S417).

The driver of the DSC 101 then sends the wireless communication controller 204 a series of setting commands in order to participate in the ad-hoc network whose SSID is "AdhocNet". Thus, the DSC 101 sets the BSSID to a value identical with that of the network established by the printer 102 and participates in the network.

When the time T1 elapses, the printer 102 performs scanning in order to determine whether an ad-hoc network having an SSID identical with the SSID "AdhocNet" being used by the printer 102 exists. The driver of the printer 102 sends the wireless communication controller 304 a series of commands for scanning purposes (S419). The wireless communication controller 304 and the wireless communication RF unit 305 process the commands and transmit a probe request (S420).

Since the DSC 101 is already participating in the same ad-hoc network as the printer 102 at this time, the DSC 101 sends a probe response back to the printer 102 (S421).

When the printer 102 receives the probe response, the wireless communication controller 304 delivers to the driver the information obtained from the probe response (S422). The driver of the printer 102 compares the delivered information with the information relating to the network established by the printer 102 and can tell that the DSC 101 is participating in the same ad-hoc network as that of the printer 102.

Figure 5:
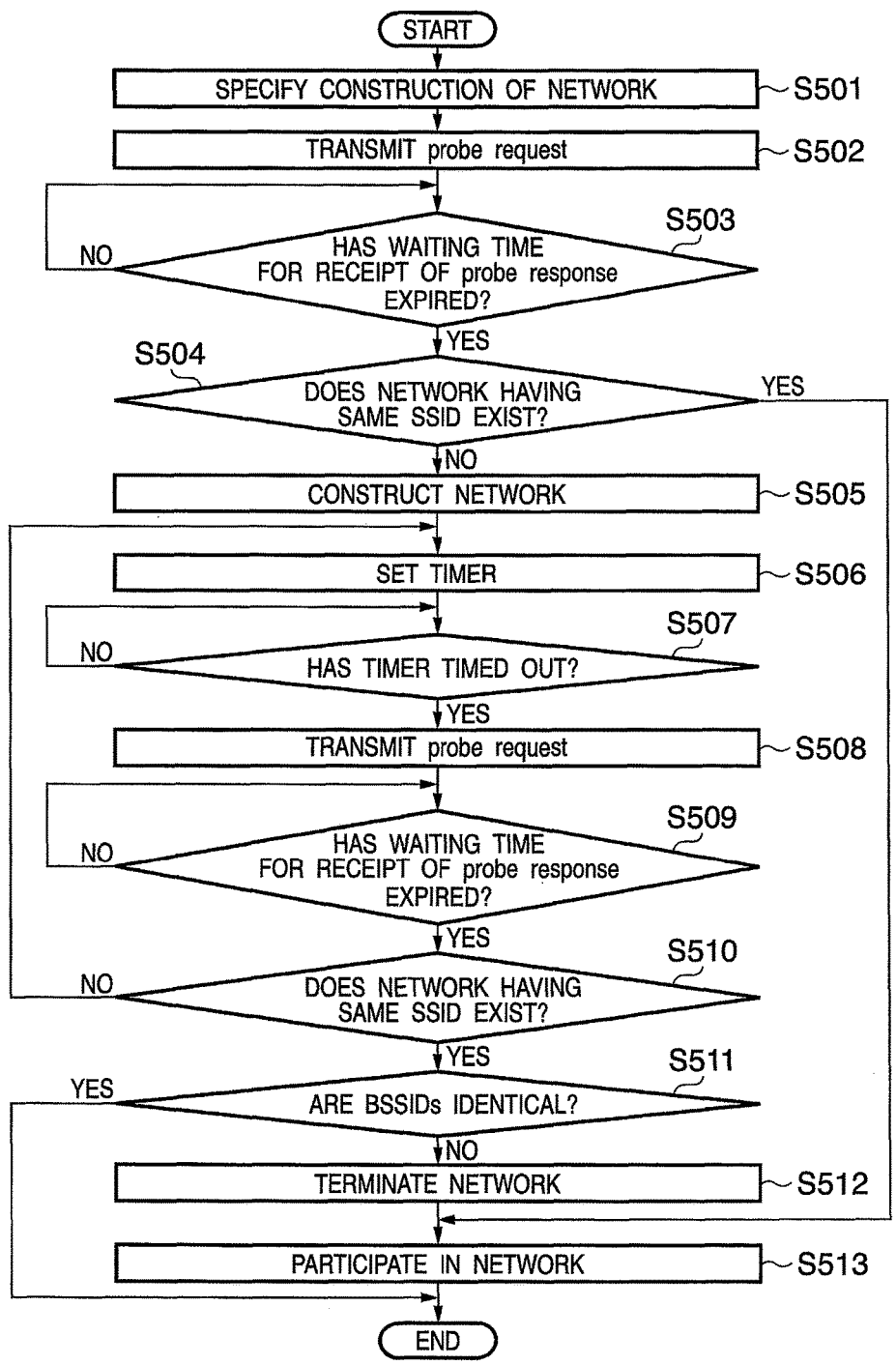
FIG. 5 is a flowchart illustrating operation of the DSC and printer according to the first embodiment.

FIG. 5 is a flowchart of operation of the DSC 101 and printer 102. Since the operating flows of the DSC 101 and printer 102 are the same, here operation will be described taking the operation of DSC 101 as an example.

If construction of an ad-hoc network is specified by pressing the wireless communication of the DSC 101 (S501), the DSC 101 performs scanning to determine whether an ad-hoc network whose SSID is "AdhocNet" exists. More specifically, the DSC 101 transmits a probe request, in which "AdhocNet" is specified in the SSID, by broadcast (S502) and then waits a fixed period of time for a probe response to be sent back as a response (S503). Here the term "broadcast" refers to a transmission to an unspecified number of communication partners.

If the result of scanning is detection of an ad-hoc network whose SSID is "AdhocNet" ("YES" at S504), then the DSC 101 executes processing for participating in the detected ad-hoc network (S513) and then terminates processing.

If no network having the "AdhocNet" SSID exists ("NO" at S504), then the DSC 101 executes processing to establish an ad-hoc network whose SSID is "AdhocNet" (S505). More specifically, the DSC 101 generates a BSSID based upon its own MAC address and starts transmitting a beacon.

After establishing the ad-hoc network, the DSC 101 sets any value T in the timer (S506) and then waits for the timer to time out (S507). If the timer times out ("YES" at S507), then the DSC 101 performs scanning in order to determine whether an ad-hoc network having an SSID identical with that of the network established by the DSC 101 exists (S508, S509).

If the result of scanning is that no network having the same SSID has been detected ("NO" at S510), then processing from S506 onward is repeated. If the result of scanning is detection of network having the same SSID ("YES" at S510), then the DSC 101 determines whether the BSSID of the detected network is identical with the BSSID of the network established by the DSC 101 (S511). If the BSSID is identical ("YES" at step S511), then the DSC 101 can tell that the other communication apparatus (printer 102) is present on the same network. The DSC 101 therefore terminates processing.

If the BSSID is not identical ("NO" at S511), then the DSC 101 terminates the ad-hoc network that was established by the DSC 101 (S512) and executes processing for participating in the detected network (S513). That is, the DSC 101 sets the BSSID to a value identical with that of the BSSID of the detected network.

It should be noted that after participating in the network (S513 in FIG. 5), the DSC 101 may perform scanning again and execute processing for determining whether the other communication apparatus (printer 102) is present on the same network. Since the fact that the DSC 101 and printer 102 have formed the same network can be verified by this processing, communication reliability can be further enhanced.

This embodiment is such that in a case where a network having the same BSSID as that established by the apparatus itself is detected, the established network is terminated and the apparatus participates in the detected network. Accordingly, a network can be constructed between communication apparatuses that intend to participate in the same network.

Thus, even in the event that two communication apparatuses have established networks having different BSSIDs regardless of the fact that the respective SSIDs are identical, one communication apparatus can participate in the network that has been established by the other communication apparatus. This makes it possible to enhance communication reliability and user convenience.

(Second Embodiment)

A second embodiment will be described next. It should be noted that the network configuration and the hardware configurations of the DSC 101 and printer 102 are similar to those of the first embodiment (see FIGS. 1, 2 and 3) and need not be described again.

In this embodiment, the processing executed in a case where ad-hoc networks having the same SSID but different BSSIDs is different from that of the first embodiment.

FIG. 6 is a flowchart of operation of the DSC 101 and printer 102 according to this embodiment. Since the operating flows of the DSC 101 and printer 102 are the same, here operation will be described taking the operation of DSC 101 as an example. The processing of steps S601 to S610 is identical with that of the processing of steps S501 to S510 in FIG. 5 and need not be described again.

If the DSC 101 has detected a network whose SSID is identical with that of network established by the DSC 101 ("YES" at S610), then, in accordance with a prescribed rule, the DSC 101 compares the BSSID of the detected network with that of the network established by the DSC 101 itself (S611).

Examples of methods that can be mentioned as examples of rules used at the time of the comparison are a method of adopting the smaller BSSID value as inferior and the larger BSSID value as superior when the BSSIDs are handled as numerals, and a method of, conversely, adopting the smaller value as superior and the larger value as inferior.

If the result of the comparison is that the BSSID of the network established by the DSC 101 is judged to be inferior ("YES" at S611), then the DSC 101 terminates the network established by the DSC 101 (S612) and executes processing for participating in the detected network (S613). That is, by setting its BSSID to be identical with the BSSID of the detected network, the DSC 101 is capable of constructing the same network as that of the other communication apparatus (printer 102).

If the result of comparing the BSSIDs is that the BSSID of the network established by the DSC 101 is judged to be superior or the same as the BSSID of the detected network ("NO" at S611), then the DSC 101 terminates processing. In this case, the apparatus (printer 102) that established the detected network participates in the network established by the DSC 101.

It should be noted that before BSSID superiority or inferiority is judged at S611, the DSC 101 may check to see whether the BSSIDs are identical, terminate processing when they are identical and make the superiority/inferiority judgment when they are not identical.

FIG. 7 is a diagram illustrating flow of operation with the addition of processing for finally confirming whether the DSC 101 and printer 102 were able to construct identical networks. The processing of steps S701 to S710 in FIG. 7 is identical with steps S601 to S610 of FIG. 6 and need not be described again.

If the DSC 101 has detected a network whose SSID is identical with that of network established by the DSC 101 ("YES" at S710), then, in accordance with a prescribed rule, the DSC 101 compares the BSSID of the detected network with that of the network established by the DSC 101 itself (S711).

If the result of the comparison is that the BSSID of the network established by the DSC 101 is judged to be inferior ("YES" at S711), then the DSC 101 terminates the network established by the DSC 101 (S712) and executes processing for participating in the detected network (S713). Then, in order to confirm whether another communication apparatus (printer 102) exists on the network in which the DSC 101 participates, control returns to S708 and the DSC 101 performs scanning.

If the result of comparing the BSSIDs is that the BSSID of the network established by the DSC 101 is judged to be the same as the BSSID of the detected network ("NO" at S711 and "YES" at S714), then the DSC 101 can recognize that the other communication apparatus (printer 102) is participating in the same network. The DSC 101 therefore terminates processing.

If the BSSID of the network established by the DSC 101 is judged to be superior ("NO" at S711 and "NO" at S714), then control returns to S706 and the DSC 101 executes processing for confirming that the other communication apparatus (printer 102) is participating in the network established by the DSC 101. Since a certain length of time is necessary in order for the other communication apparatus to participate in the network, any value T is set in the timer before scanning is executed (S706). When the timer times out ("YES" at S707), the DSC 101 performs scanning (S708, S709).

This embodiment is such that in a case where two communication apparatuses have established separate networks having identical SSIDs and different BSSIDs, which of the communication apparatuses will participate in the network established by the other communication apparatus is decided in dependence upon the result of comparison of the BSSIDs. Accordingly, the communication apparatus that participates in the network can be decided uniquely, the same network can be constructed efficiently and convenience can be enhanced.

Further, in accordance with FIG. 7, processing continues until it is confirmed that the apparatuses are participating in the same network. This means that the DSC 101 and printer 102 are capable of constructing the same network more reliably.

(Third Embodiment)

A third embodiment will be described next. It should be noted that the network configuration and the hardware configurations of the DSC 101 and printer 102 are similar to those of the first embodiment (see FIGS. 1, 2 and 3) and need not be described again.

This embodiment will be described with regard to a processing method in a case where the DSC 101 and printer 102 are temporarily connected wirelessly and information relating to the printer 102 is registered.

It will be assumed here that the SSID of a temporary ad-hoc network constructed in order to register information relating to the communication partner uses a value different from that of the SSID used in ordinary wireless communication. Let "SetNet" be the SSID used in registering the information relating to the communication partner, and assume that the DSC 101 and printer 102 have stored the SSIDs in the flash ROMs 213, 313, respectively, in advance.

FIGS. 8A to 8D are diagrams illustrating examples of the display units 206 and 306 of the DSC 101 and printer 102, respectively, in a case where communication partner information is registered. Described here will be an example of display in a case where the DSC 101 registers the printer 102 as the communication partner. Accordingly, the description that follows will relate to the examples of the display presented on the display unit 206 of the DSC 101.

Figure 8A:
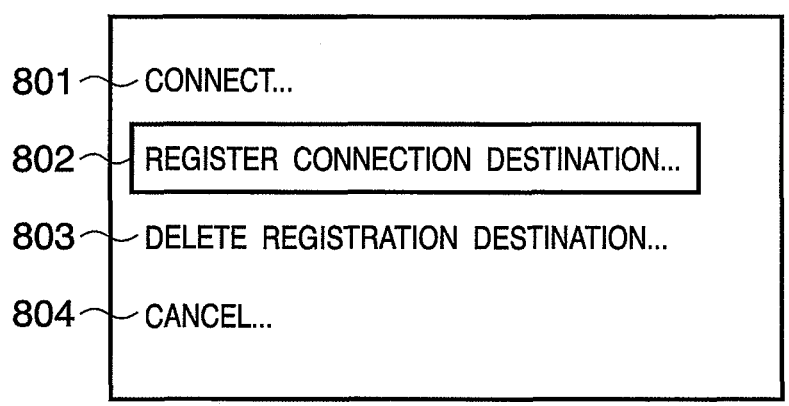

FIG. 8A shows an example of a screen displayed in a case where execution of wireless communication via a network has been selected. An item 801 is selected in a case where communication is performed upon selecting a previously registered communication partner; an item 802 is selected when communication partner information is registered; an item 803 is selected in a case where already registered communication partner information is deleted; and an item 804 is selected when wireless communication via the network is cancelled. In order to register communication partner information, the user selects item 802 using the control panel 210.

Figure 8B:
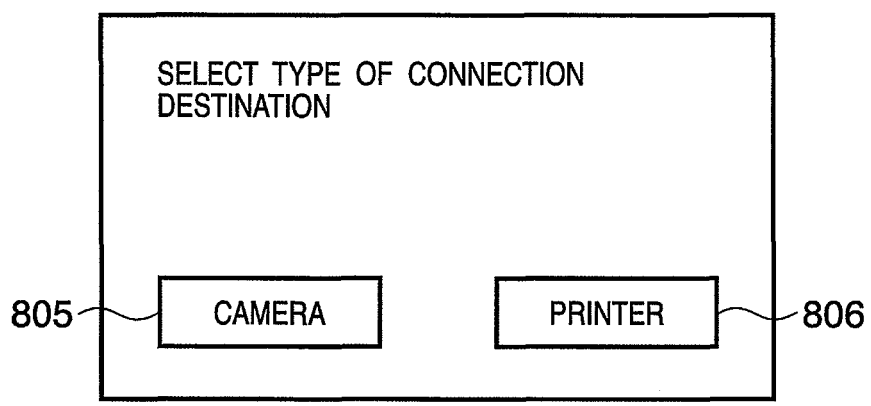

FIG. 8B shows an example of the display unit 206 when item 802 has been selected. Here an item 805 is selected in a case where DSC information is registered as the type of communication partner, and an item 806 is selected in a case where printer information is registered as the type of communication partner. In order for the DSC 101 to register the printer information as the communication partner, the user selects item 806 using the control panel 210.

FIG. 8C shows an example of the display unit 206 when the type of communication partner to be registered has been selected in FIG. 8B (i.e., after item 805 or 806 has been selected). When this screen is being displayed, the DSC 101 constructs, between itself and the printer 102, a wireless communication network for registration purposes and executes processing for registering device information of the kind shown in FIGS. 9A to 9C. The details of this registration processing will be described later.

FIG. 8D shows an example of the display unit 206 after the information registration operation between the DSC 101 and printer 102 has been completed. Here a button 807 prompts confirmation of processing. If the user selects button 807 using the control panel 210, the display of display unit 206 returns to that shown in FIG. 8A.

Figure 9A:
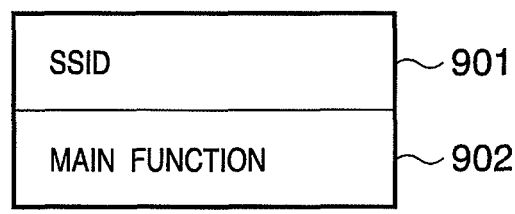
FIGS. 9A to 9C illustrate examples of some information relating to the DSC and printer according to the third embodiment.
Figure 9B:
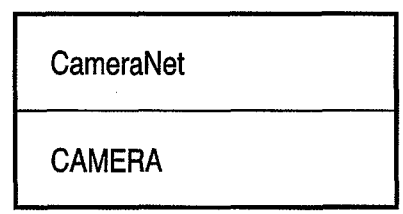
Figure 9C:
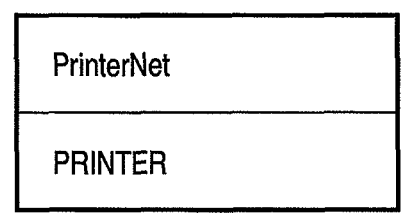

FIGS. 9A to 9C illustrate examples of some information possessed by each communication apparatus and relating to the apparatus per se. By executing the registration processing described above, each communication apparatus is capable of locally registering communication partner information. In FIG. 9A, an SSID 901 is used in a case where the communication apparatus establishes an ad-hoc network. Reference numeral 902 denotes the type of communication apparatus.

FIG. 9B shows an example of information possessed by the DSC 101, and FIG. 9C shows an example of information possessed by the printer 102. For example, if item 801 is selected, in the DSC 101, from the screen display of FIG. 8A after information (FIG. 9C) relating to the printer 102 has been registered and the printer 102 is selected from the displayed list of communication partners, then the SSID is set to "PrinterNet" and wireless communication with the printer 102 can be performed.

Figure 10:
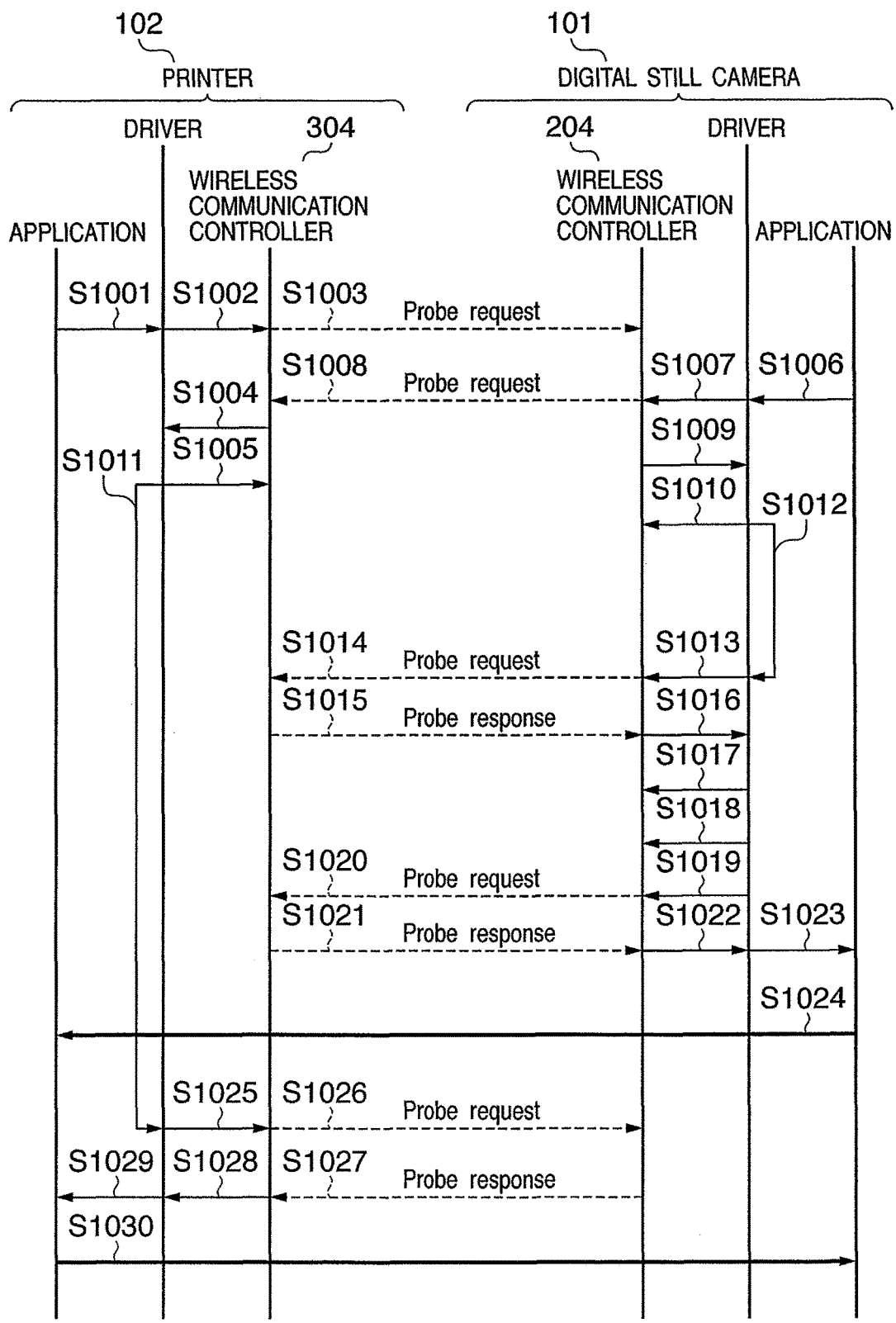
FIG. 10 is a sequence diagram illustrating a case where communication partner information is registered in the third embodiment.

FIG. 10 is a sequence diagram in a case where the DSC 101 and printer 102 execute processing for communication partner registration respectively. Here it will be assumed that the method of FIG. 7 is used as the method of constructing an ad-hoc network for registration of a communication partner.

When the printer 102 starts executing communication partner registration processing in response to an operation by the user, the application program issues a request to the driver to construct an ad-hoc network whose SSID is "Set-Net" (S1001).

Upon receiving the request from the application program, the driver performs scanning to determine whether an ad-hoc network whose SSID is "SetNet" exists. First, a series of commands for scanning are issued from the driver to the wireless communication controller 304 (S1002). Next, the commands are processed by the wireless communication controller 304 and wireless communication RF unit 305 and a probe request (search request) is transmitted thereby (S1003). Receipt of a probe response is awaited for a fixed period of time.

At this point in time the DSC 101 has not yet established an ad-hoc network and therefore the response standby time elapses without the printer 102 receiving a probe response.

Upon confirming that a network does not exist (S1004), the driver of the printer 102 sends the wireless communication controller 304 a series of setting commands for establishing an ad-hoc network whose SSID is "SetNet" (S1005).

The wireless communication controller 304 processes the commands received from the driver and establishes an ad-hoc network having "SetNet" as its SSID. More specifically, the wireless communication controller 304 generates a BSSID from the MAC address of its own printer 102 and starts transmitting a beacon.

Here it will be assumed that communication partner registration processing is started on the side of the DSC 101 at the same timing as that at which the printer 102 starts executing communication partner registration processing.

When the DSC 101 starts executing communication partner registration processing in response to an operation by the user, the application program issues a request to the driver to construct an ad-hoc network whose SSID is "SetNet" (S1006).

Upon receiving the request from the application program, the driver performs scanning to determine whether an ad-hoc network whose SSID is "SetNet" exists. First, a series of commands for scanning are issued from the driver to the wireless communication controller 204 (S1007).

Next, the commands are processed by the wireless communication controller 204 and wireless communication RF unit 205 and a probe request (search request) is transmitted thereby (S1008). Receipt of a probe response is awaited for a fixed period of time.

At this point in time the printer 102 has not yet established an ad-hoc network and therefore the response standby time elapses without the DSC 101 receiving a probe response.

Upon confirming that a network does not exist (S1009), the driver of the DSC 101 sends the wireless communication controller 204 a series of setting commands for establishing an ad-hoc network whose SSID is "SetNet" (S1010).

The wireless communication controller 204 processes the commands received from the driver and establishes an ad-hoc network having "SetNet" as its SSID. More specifically, the wireless communication controller 204 generates a BSSID from the MAC address of its own DSC 101 and starts transmitting a beacon.

At the moment step S1010 ends, the DSC 101 and printer 102 construct separate ad-hoc networks having different BSSIDs regardless of the fact that the SSIDs are identical, namely "SetNet".

After establishing the ad-hoc network (S1005), the printer 102 sets any value T1 in the timer possessed by the system controller 311 (S1011). Similarly, after establishing the ad-hoc network, the DSC 101 sets any value T2 in the timer possessed by the system controller 211 (S1012). In FIG. 12, the time T2 set by the DSC 101 is shorter than the time T1 set by the printer 102 and therefore time T2 in the timer of DSC 101 elapses first.

When time T2 elapses, the DSC 101 performs scanning in order to determine whether an ad-hoc network having an SSID identical with the SSID "SetNet" of the ad-hoc network established by the DSC 101 itself exists. First, the driver of the DSC 101 sends the wireless communication controller 204 a series of commands for scanning purposes (S1013). The wireless communication controller 204 and the wireless communication RF unit 205 process the commands and transmit a probe request (S1014).

Since the printer 102 has specified "SetNet" in the SSID and established an ad-hoc network, at this time the printer 102 sends back a probe response to the DSC 101 (S1015).

When the DSC 101 receives the probe response, the wireless communication controller 204 delivers to the driver the information obtained from the probe response (S1016). From the delivered information, the driver detects the existence of the other ad-hoc network having the same SSID and a different BSSID from those of the network established by the DSC 101.

The DSC 101 compares the BSSID of the network established by the DSC 101 itself with the BSSID of the detected network, namely of the network established by the printer 102, and determines the superiority/inferiority of the BSSIDs. FIG. 10 shows an example of a case where the BSSID of the network established by the DSC 101 is inferior.

Since the result of the BSSID superiority/inferiority evaluation is that the BSSID of the network established by the DSC 101 itself is inferior, the DSC 101 executes processing for participation in the network established by the printer 102.

First, the driver of the DSC 101 sends the wireless communication controller 204 a series of setting commands in order to terminate the network (S1017).

The driver of the DSC 101 then sends the wireless communication controller 204 a series of setting command for participating in the ad-hoc network whose SSID is "SetNet" (S1018). The DSC 101 sets the BSSID to a value identical with that of the network established by the printer 102 and participates in the network.

The DSC 101 performs scanning again in order to determine whether another wireless communication apparatus, namely the printer 102, exists on the ad-hoc network in which the DSC 101 is participating. The driver of the DSC 101 sends the wireless communication controller 204 a series of commands for scanning purposes (S1019). The wireless communication controller 204 and wireless communication RF unit 205 process the commands and transmit a probe request (S1020).

Since the printer 102 has specified "SetNet" in the SSID and established an ad-hoc network, at this time the printer 102 sends back a probe response to the DSC 101 (S1021).

When the DSC 101 receives the probe response, the wireless communication controller 204 delivers to the driver the information obtained from the probe response (S1022). From the delivered information, the driver recognizes that the BSSID of the network to which the DSC 101 belongs and the BSSID of the detected network are identical. Accordingly, the DSC 101 is capable of confirming that another wireless communication apparatus, namely the printer 102, exists on the ad-hoc network to which the DSC 101 belongs. Here the driver issues the application a signal indicating the completion of the ad-hoc network for the purpose of communication partner registration processing (S1023). Upon being so notified, the application executes processing for registering the printer 102 as the communication partner (S1024).

When the time T1 elapses, the printer 102 performs scanning in order to determine whether an ad-hoc network having an SSID identical with the SSID "SetNet" of the network established by the printer 102 exists. The driver of the printer 102 sends the wireless communication controller 304 a series of commands for scanning purposes (S1025). The wireless communication controller 304 and the wireless communication RF unit 305 process the commands and transmit a probe request (S1026).

Since the DSC 101 is at this time already participating in the ad-hoc network established by the printer 102, the DSC 101 sends a probe response back to the printer 102 (S1027).

When the printer 102 receives the probe response, the wireless communication controller 304 delivers to the driver the information obtained from the probe response (S1028). The driver of the printer 102 compares the delivered information with the information relating to the network established by the printer 102 and confirms that the DSC 101 is participating in the same ad-hoc network as that of the printer 102.

Here the driver of the printer 102 issues the application a signal indicating the completion of the ad-hoc network for the purpose of communication partner registration processing (S1029). Upon being so notified, the application executes processing for registering the printer 102 as the communication partner (S1030). That is, at step S1030, the printer 102 sends back registration information to the DSC 101 in response to the registration request from the DSC 101 at step S1024.

Although the method illustrated in FIG. 7 is used as the method of constructing an ad-hoc network for communication partner registration in this embodiment, the method illustrated in FIG. 5 or 6 may be used.

This embodiment is such that in a case where a temporary ad-hoc network is constructed in order to execute communication partner registration processing, the processing for registering the communication partner is executed after the network is constructed. This makes it possible to execute registration processing reliably.

Further, although this embodiment has been described taking as an example a case where communication partner registration processing is executed, the processing that follows the construction of the ad-hoc network is not limited to communication partner registration processing. For example, the invention is adaptable to a variety of processing, such as print processing between the DSC and printer, processing for transferring image files between DSCs, and file transfer processing executed upon connecting the DSC and a computer.

Further, in this embodiment, displays of the kind illustrated in FIGS. 8A to 8D are presented on the display unit 306 of the printer 102 as well. However, displays of the kind illustrated in FIGS. 8A to 8D are not necessarily required. For example, if the printer is one equipped only with an LED as the display unit 306, a network whose SSID is "PrinterNet" is established when power is introduced from the power supply. Use may be made of a method of constructing a network (whose SSID is "SetNet") for communication partner registration in a case where a switch (not shown) on the printer control panel 310 is pressed.

(Fourth Embodiment)

In the first and second embodiments, the invention has been described taking as an example a case where ad-hoc networks are constructed substantially simultaneously by the DSC 101 and printer 102. In the case of the DSC, the camera is driven by batteries and power consumption is a problem. Preferably, therefore, a wireless network is constructed only when wireless communication is necessary. In the case of the printer, on the other hand, often the printer is used upon being connected to an AC power supply. Consumption of power by wireless communication, therefore, is not much of a problem. Accordingly, a case where a wireless network is established immediately after power is introduced to the printer is conceivable.

In this case, if the method (see FIGS. 5, 6 and 7) of the foregoing embodiment is used, the printer must perform scanning at fixed time intervals for a period of time extending from establishment of the network to participation of the other communication apparatus in the network (S506 to S510 in FIG. 5, S606 to S610 in FIG. 6, S706 to S710 in FIG. 7). In this embodiment, therefore, a case will be described in which the method of constructing the network is changed depending upon the functions of each communication apparatus.

Figure 11:
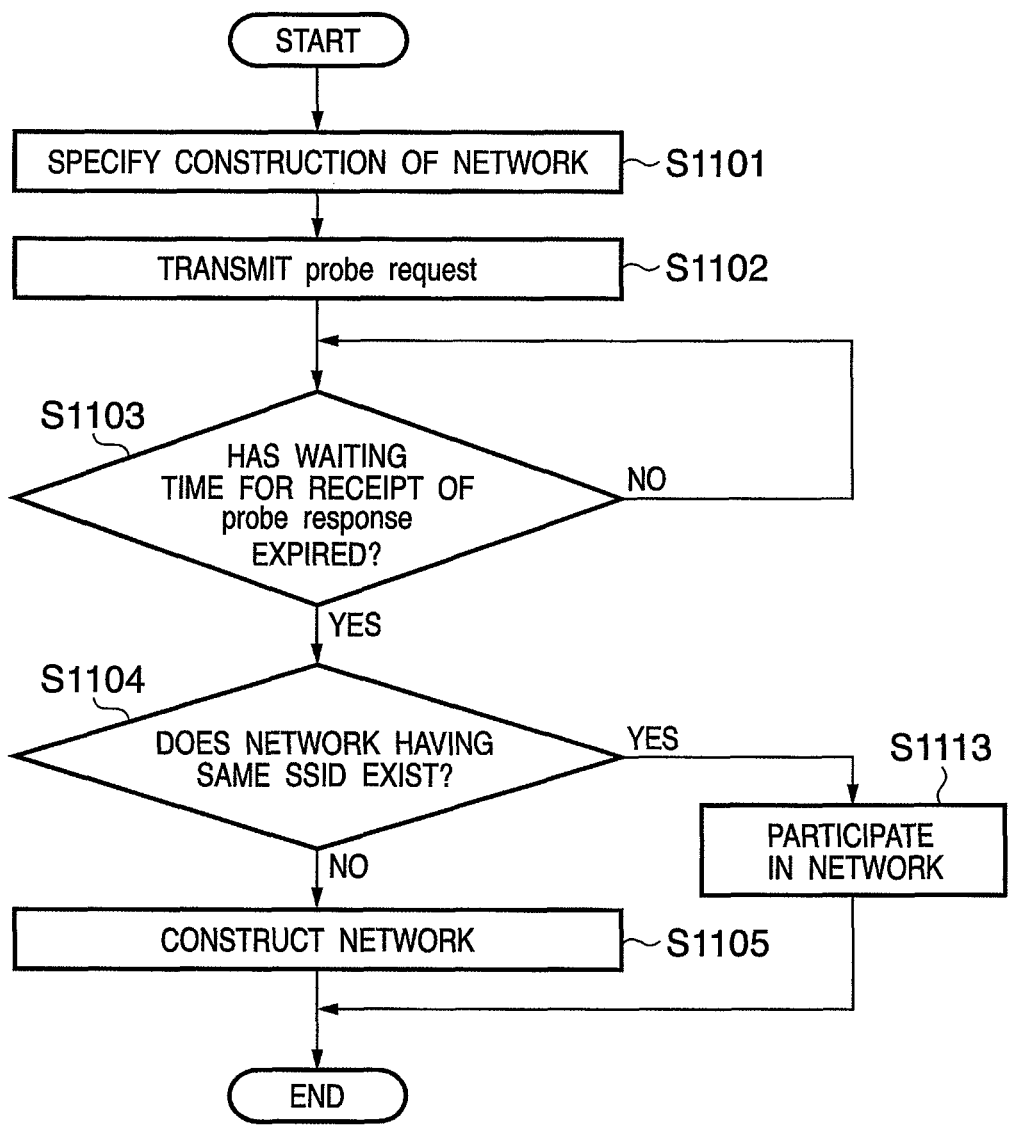
FIG. 11 is a flowchart illustrating operation of the printer according to the fourth embodiment.

FIG. 11 is a flowchart illustrating the flow of operation of the printer 102 in this embodiment. If construction of an ad-hoc network is specified (S1101), the printer 102 performs scanning to determine whether an ad-hoc network whose SSID is "AdhocNet" exists (S1102, S1103).

If the result of scanning is detection of an ad-hoc network whose SSID is "AdhocNet" ("YES" at step S1104), the printer 102 executes processing for participating in the detected ad-hoc network (S1113) and then terminates processing.

If it is found that ad-hoc network whose SSID is "AdhocNet" does not exist ("NO" at step S1104), then the printer 102 executes processing for establishing ad-hoc network whose SSID is "AdhocNet" (S1105).

FIG. 12 is a flowchart illustrating the flow of operation of the DSC 101 in this embodiment.

If construction of an ad-hoc network with a communication apparatus specified by the user is instructed (S1201), processing diverges depending upon whether the type of communication partner specified is equivalent to that of the DSC 101 per se (S1202). If the type of communication partner is equivalent to that of the DSC 101, e.g., if the communication partner is a DSC ("YES" at S1202), then processing from S702 (FIG. 7) onward is executed. It should be noted that the processing from S502 (FIG. 5) onward and the processing from S602 (FIG. 6) onward may also be executed.

If the type of communication partner is not equivalent to that of the DSC 101 per se, e.g., if it is a printer ("NO" at S1202), then the DSC 101 performs network scanning (S1203, S51204) and whether or not an ad-hoc network having the same SSID exists is investigated (S1205). If an ad-hoc network whose SSID is "AdhocNet" is detected ("YES" at S1205), then the DSC 101 executes processing for participating in this network (S1208).

If an ad-hoc network whose SSID is "AdhocNet" is not detected ("NO" at S1205), the DSC 101 sets any value T in the timer (S1206) and then waits for the timer to time out (S1207). If the timer times out ("YES" at S1207), then the DSC 101 performs network scanning again (S1203, S1204). The processing of steps S1203 to S1207 is thus repeated until an ad-hoc network whose SSID is "AdhocNet" can be detected. However, in a case where the network cannot be detected even though the processing is executed a prescribed number of times or for a prescribed period of time, the processing may be forcibly terminated.

In accordance with this embodiment, it is possible for a communication apparatus to change the connection method depending upon the type of communication partner when an ad-hoc network is constructed. This makes it possible to construct an ad-hoc network efficiently. The printer need only stand by until the DSC participates in the network that has been constructed by the printer itself, and it is unnecessary to perform network scanning. Further, if the communication partner of a DSC is a printer, the DSC need only wait for the printer to establish the network. This means that the establishment of a network having a different BSSID no longer occurs.

It should be noted that although the connection method is changed depending upon the type of communication partner in the foregoing embodiment, the connection method may be changed depending upon the functions, type and attributes, etc., of the communication partner.

Thus, in accordance with each of the embodiments set forth above, even if a plurality of communication apparatuses that intended to participate in the same network have constructed different networks, one apparatus participates in the network established by the other apparatus until the network established by the first-mentioned apparatus is terminated. As a result, the same network can be constructed reliably. Further, since registration of a communication partner is performed after construction of a network with a specified communication apparatus has been confirmed, a communication apparatus that is incapable of wireless communication will no longer be registered and user convenience can be enhanced. Furthermore, since the method of constructing a network is changed in dependence upon the type of communication partner, it is unnecessary to execute extra processing and a network can be constructed with a desired partner in efficient fashion.

In each of the foregoing embodiments, it is described that the BSSID is generated arbitrarily based upon the a MAC address, etc. However, the BSSID may be generated by another method. For example, the communication apparatus may generate random values or the serial number, etc., of the communication apparatus may be used as is.

Further, in each of the foregoing embodiments, the invention has been described taking as an example a case where another network is searched for (by active scanning) based upon the sending and receiving of a probe request/probe response. However, network scanning may be performed by another method. An example is passive scanning, which involves monitoring a beacon transmitted by another wireless communication apparatus. In the case of passive scanning, the received beacon contains the network information such as the SSID and BSSID.

Further, in the foregoing embodiments, the present invention is described taking as an example a connection between a DSC and a printer. However, the present invention is applicable so long as the apparatus is a communication apparatus having a function that enables the construction of an ad-hoc network, such as a connection between DSCs, a connection between a DSC and a personal computer, and a connection between a printer and a DSC.

Further, the present invention is applicable also to all wireless communication schemes such as a 802.11 wireless LAN, Bluetooth, UWB, wireless USB, wireless 1394 and Wimax. In addition, the present invention is applicable not only to wireless communication but also to wired communication.

Thus, as described above, even if a plurality of communication apparatuses that intended to participate in the same network have constructed different networks, it is possible for these apparatus to participate in the same network. Communication reliability and user convenience can be enhanced as a result.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-040960, filed Feb. 17, 2006, which is hereby incorporated by reference herein in its entirety.

The invention claimed is:

1. A method of deciding which role of a first role for generating a wireless network and a second role for participating in a generated wireless network, a communication apparatus operates, said method comprising the steps of:
generating a wireless network when operating in the first role;
participating in a generated wireless network when operating in the second role;
comparing first information set in another apparatus with first information set in said communication apparatus; and
determining based on second information, in a case where the first information set in said another apparatus is the same as the first information set in said communication apparatus, which of the first role and the second role said communication apparatus operates in,
wherein a value of the second information is set randomly in at least one of said communication apparatus and said another apparatus.

2. The method according to claim 1, wherein the wireless network is a wireless LAN conforming to IEEE802.11 series.

3. The method according to claim 1, wherein the first information set in said communication apparatus and the first information set in the other apparatus are identification information for identifying a wireless network.

4. The method according to claim 1 wherein the second information is a BSSID.

5. The method according to claim 1, further comprising:
sending a request; and
receiving a response to the request,
wherein the first information set in the other apparatus is included in the response.

6. The method according to claim 5, wherein the request includes the first information set in said communication apparatus.

7. The method according claim 1 wherein the wireless network is ad-hoc network.

8. The method according to claim 1 wherein, in the determining step, the role is determined based on a large/small relation of a value represented by the second information randomly set in said communication apparatus and a value represented by the second information randomly set in the another apparatus.

9. The method according to claim 1, wherein the other apparatus comprises a printer.

10. The method according to claim 1, wherein the other apparatus comprises a camera.

11. The method according to claim 1, further comprising displaying a selecting screen for selecting a communication partner with which said communication apparatus communicates in the wireless network.

12. The method according to claim 1, wherein the second information is randomly set by said communication apparatus and said another apparatus.

13. The method according to claim 1, wherein the determining step
determines that the communication apparatus operates in the first role in a case where a value of the second information set in the communication apparatus is larger than a value of the second information set in said another apparatus, and
determines that the communication apparatus operates in the second role in a case where a value of the second information set in the communication apparatus is smaller than a value of the second information set in said another apparatus.

14. The method according to claim 1, wherein the determination based on the second information is not performed in a case where the first information received by said receiving unit and the first information set in said communication apparatus is not same.

15. A communication apparatus comprising:
a processor;
a wireless communication controller; and
a memory,
wherein the processor, the wireless communication controller, and the memory are operably configured to cause said communication apparatus to:
generate a wireless network when operating in a first role;
participate in a wireless network when operating in a second role;
receive first information set in another apparatus from said another apparatus;
determine based on second information, in a case where the received first information and first information set in said communication apparatus are the same as each other, which of the first role and the second role said communication apparatus operates in, wherein the value of the second information is set randomly in at least one of said communication apparatus and said another apparatus; and
perform wireless communication with the another apparatus in accordance with the determined role.

16. The apparatus according to claim 15, wherein the wireless network is a wireless LAN conforming to IEEE802.11 series.

17. The apparatus according to claim 15, wherein the first information set in said communication apparatus and the first information set in said another apparatus are identification information for identifying a wireless network.

18. The apparatus according to claim 15, wherein the second information is a BSSID.

19. The apparatus according to claim 15, wherein the processor, the wireless communication controller, and the memory are operably configured to cause said communication apparatus to:
send a request, and
wherein the received first information is received in response to the request.

20. The apparatus according to claim 19, wherein the request includes the first information set in said communication apparatus.

21. The apparatus according claim 15, wherein the wireless network is ad-hoc network.

22. The apparatus according to claim 15, wherein the processor, the wireless communication controller, and the memory are operably configured to cause said communication apparatus to determine which of the first role and the second role said communication apparatus operates in based on a large/small relation of a value represented by the second information randomly set in said communication apparatus and a value represented by the second information randomly set in said another apparatus.

23. The apparatus according to claim 15, wherein at least one of said communication apparatus and said another apparatus comprises a printer.

24. The apparatus according to claim 15, wherein at least one of said communication apparatus and said another apparatus comprises a camera.

25. The apparatus according to claim 15, further comprising a display unit configured to display a selecting screen for selecting a communication partner with which said communication apparatus communicates in the wireless network.

26. The apparatus according to claim 15, wherein the second information is randomly set by said communication apparatus and said another apparatus.

27. The apparatus according to claim 15, wherein
the communication apparatus operates in the first role in a case where a value of the second information set in the communication apparatus is larger than a value of the second information set in said another apparatus, and
the communication apparatus operates in the second role in a case where a value of the second information set in the communication apparatus is smaller than a value of the second information set in said another apparatus.

28. The apparatus according to claim 15, wherein the processor, the wireless communication controller, and the memory are operably configured to cause said communication apparatus to not determine which of the first role and the second role said communication apparatus operates in in a case where the received first information and the first information set in said communication apparatus are not same.

29. A non-transitory computer readable medium storing a program causing a computer to execute the steps of:
generating a wireless network when operating in the first role;
participating in a generated wireless network when operating in the second role;
comparing first information set in another apparatus with first information set in said communication apparatus; and
determining based on second information, in a case where the first information set in said another apparatus is the same as the first information set in said communication apparatus, which of the first role or the second role said communication apparatus operates in,
wherein a value of the second information is set randomly in at least one of said communication apparatus and said another apparatus.

* * * * *